(12) United States Patent
Hegerath et al.

(10) Patent No.: US 7,395,908 B2
(45) Date of Patent: Jul. 8, 2008

(54) HYDRAULIC SYSTEM FOR PROVIDING PRESSURES AND VOLUMETRIC FLOWS IN A DUAL CLUTCH TRANSMISSION

(75) Inventors: Andreas Hegerath, Bergheim (DE); Reinhard Möhlmann, Köln (DE); Martin Leibbrandt, Bedburg (DE); Ulrich Eggert, Viersen (DE)

(73) Assignee: Getrag Ford Transmissions GmbH, Cologne (DE)

( * ) Notice: Subject to any disclaimer, the term of this patent is extended or adjusted under 35 U.S.C. 154(b) by 236 days.

(21) Appl. No.: 11/216,318

(22) Filed: Aug. 31, 2005

(65) Prior Publication Data

US 2006/0054447 A1    Mar. 16, 2006

(30) Foreign Application Priority Data

Sep. 16, 2004    (EP) .................................. 04104495

(51) Int. Cl.
*B60W 10/02* (2006.01)
*B60W 10/10* (2006.01)
*F16D 13/72* (2006.01)
*F16D 13/74* (2006.01)

(52) U.S. Cl. .................. 192/3.58; 192/113.35

(58) Field of Classification Search ............. 192/113.35
See application file for complete search history.

(56) References Cited

U.S. PATENT DOCUMENTS

| 3,823,801 | A | * | 7/1974 | Arnold | .................. 192/113.35 |
| 5,669,479 | A | | 9/1997 | Matsufuji | |
| 2002/0002878 | A1 | | 1/2002 | Petrzik | |
| 2004/0112171 | A1 | | 6/2004 | Kuhstrebe et al. | |
| 2006/0054442 | A1 | * | 3/2006 | Hegerath et al. | ........... 192/48.9 |

FOREIGN PATENT DOCUMENTS

| DE | 103 06 895 A1 | 2/2003 |
| EP | 1 413 803 A2 | 4/2004 |
| JP | 01188723 | 7/1989 |
| WO | WO03/040580 A1 | 5/2003 |

* cited by examiner

*Primary Examiner*—Rodney H Bonck
(74) *Attorney, Agent, or Firm*—Alexander R. Schlee

(57) ABSTRACT

The invention relates to a hydraulic system (1) for providing pressures and volumetric flows in a dual clutch transmission, in particular for providing a first volumetric flow for cooling and lubricating a first clutch (2) and for providing a second volumetric flow for cooling and lubricating a second clutch (3). The hydraulic system is distinguished by the fact that at least one switching valve (4), which in a first position guides a lubricating flow onto the first clutch (2) and a cooling flow onto the second clutch (3) and in a second position guides the lubricating flow onto the second clutch (3) and the cooling flow onto the first clutch (2), is connected upstream of the first clutch (2) and the second clutch (3). The cooling flow is preferably variable.

16 Claims, 3 Drawing Sheets in a dual clutch transmission, in particular for lubricating and cooling the two clutches of the dual clutch transmission, which is of simple construction, is inexpensive to produce and continues to provide the pressures and volumetric flows required for operation of the dual clutch transmission even in the event of one of its components failing.

HYDRAULIC SYSTEM FOR PROVIDING PRESSURES AND VOLUMETRIC FLOWS IN A DUAL CLUTCH TRANSMISSION

Priority from the European Patent Application 04104495.9 is claimed, the content of which is herewith incorporated entirely by reference.

BACKGROUND OF THE INVENTION

The invention relates to a hydraulic system for providing pressures and volumetric flows in a dual clutch transmission, in particular for providing a first volumetric flow for cooling and lubricating a first clutch and for providing a second volumetric flow for cooling and lubricating a second clutch. In addition to cooling and lubricating the clutches, the hydraulic system also performs further tasks in dual clutch transmissions which are known from the prior art. By way of example, the hydraulic system can automatically actuate the two clutches, and gears of the dual clutch transmission are also engaged/released automatically by means of a plurality of shifting actuators.

EP 1413803 has described a method for cooling the two clutches of a dual clutch transmission in a motor vehicle. Carrying out the method requires a hydraulic system which provides a volumetric flow of oil for each clutch. The method provides for there to be a volumetric flow for the respective clutch which is dependent on an oil sump temperature, on the temperature of the oil flowing out of the respective clutch and on the power which is being transmitted by the clutches. Accordingly, a control valve or the like has to be provided for every volumetric flow in order to be able to control the volumetric flows as a function of the factors listed above.

DE 103 06 895 likewise describes a method for cooling a dual clutch of a motor vehicle; in this case, the two clutches are acted on by a single volumetric flow of a coolant together. This simplifies the structure of the corresponding hydraulic system compared to cooling with two volumetric flows. However, it is not possible for one clutch of the dual clutch transmission to be individually cooled and lubricated. Therefore, it is proposed in DE 103 06 895 that the total volumetric flow for cooling and lubricating be interrupted in particular at low temperatures, in order to reduce the drag torque caused by the coolant in the clutch and thereby to simplify the engaging of a gear. In this case, it would be sufficient to interrupt only the volumetric flow for the clutch which is assigned to the partial transmission of the dual clutch transmission in which a gear is to be engaged.

The provision of volumetric flows for in each case one clutch thereby allows targeted cooling and lubrication of the two clutches with more degrees of freedom. However, this generally leads to a greater number of hydraulic components and in particular to a greater number of expensive control valves. Moreover, when designing the hydraulic system, it needs to be ensured that at least emergency operation of the dual clutch transmission should be possible in the event of one or more of its components failing.

SUMMARY OF THE INVENTION

Therefore, the invention is based on the object of providing a hydraulic system for providing volumetric flows and pressures in a dual clutch transmission, in particular for lubricating and cooling the two clutches of the dual clutch transmission, which is of simple construction, is inexpensive to produce and continues to provide the pressures and volumetric flows required for operation of the dual clutch transmission even in the event of one of its components failing.

The object on which the invention is based is achieved by virtue of the fact that at least one switching valve, which in a first position guides a lubricating flow onto the first clutch and a cooling flow onto the second clutch and in a second position guides the lubricating flow onto the second clutch and the cooling flow onto the first clutch, is connected upstream of the first clutch and the second clutch. In this arrangement, in the first position the lubricating flow contributes to the first volumetric flow, which is used to cool and lubricate the first clutch, while in the second position of the switching valve the cooling flow is used to cool and lubricate the first clutch. This also applies in a similar way to the second clutch: The second volumetric flow for cooling and lubricating the second clutch is fed either by the cooling flow or by the lubricating flow. This means that, for example in the event of the cooling flow or the lubricating flow failing, both clutches can fundamentally still be cooled and lubricated by the switching valve being switched to the position required in each instance. The coolant and lubricant used is preferably oil.

On the other hand, if the switching valve can no longer be switched, one clutch is still cooled and lubricated by the lubricating flow alone and the other clutch is still cooled and lubricated by the cooling flow alone. If cooling and lubricating flows are configured in such a way that they ensure sufficient cooling and lubrication of a clutch on their own, it continues to be possible to operate the dual clutch transmission even in the event of it no longer being possible to switch the switching valve. Only if the switching valve and the cooling flow or lubricating flow fail simultaneously is it no longer possible to cool and lubricate one of the two clutches.

Preferably, the sum of the first and second volumetric flows for cooling and lubricating the first and second clutches corresponds to the sum of the lubricating flow and the cooling flow. As a result, the volumetric flows for cooling and lubricating the two clutches are fed exclusively from the lubricating flow or the cooling flow. This means that, for example in the first position of the switching valve, the second clutch is cooled and lubricated only by the cooling flow. Consequently, all of the coolant and lubricant for cooling and lubricating the clutches is routed via the switching valve.

In a preferred exemplary embodiment, a control valve which controls the cooling flow is connected upstream of the switching valve. The cooling flow can be varied within limits by the control valve. The volumetric flow may preferably be varied in a range from 0 l per minute up to a maximum value, for example 20 l per minute.

The cooling flow is preferably not zero in the absence of a signal which actuates the control valve. This ensures that the control valve continues to permit a cooling flow if, for example, the line which passes the signal to the control valve is interrupted or if the signaling element which generates the signal has failed. Consequently, a first and second volumetric flow for cooling and lubricating the clutches continue to be available even in the event of the signal for the control valve failing, since the cooling flow can in each case be guided to both clutches.

The control valve is preferably designed as a 2/3-way valve having an inlet and an outlet. In a first position of the control valve, a diaphragm, which permits a defined volumetric flow between inlet and outlet of the control valve, is shifted between inlet and outlet. In a second position of the control valve, inlet and outlet are disconnected. This sets the cooling flow to zero. In a third position, inlet and outlet are connected, so that the coolant or oil can flow through the control valve without obstacle and a maximum cooling flow is established.

The 2/3-way valve is in this case designed in such a way that the first position is adopted at a signal value equal to zero. This can be realized, for example, by a spring which presses the directional control valve into this first position when the signal is not present. Alternatively, the functions of the control valve can also be implemented by a 3/3-way valve with two bridged inlets.

In a preferred exemplary embodiment, the 2/3-way valve can be switched between its positions a number of times per second. If, for example, the valve is switched back and forth between the second and third positions, the result is a mean cooling flow over the course of time which is between zero and the maximum cooling flow. Any desired (mean) value for the cooling flow can be set by the ratio of the switching times, i.e. the times in which the control valve is in the second or third position. By way of example, if the ratio of the switching time in the second position to the switching time in the third position is 1:1 and if a maximum cooling flow of 20 l/min is assumed, the result is a mean cooling flow of 10 l/min.

It is preferably possible for a diaphragm, which can be used to set the lubricating flow to a constant value, to be connected upstream of the switching valve. Therefore, since the likelihood of a diaphragm failing is very low, a lubricating flow is always present when there is a pressure upstream of the diaphragm, which is preferably controlled by a main pressure regulator of the dual clutch transmission.

In a preferred exemplary embodiment, the switching valve can be switched between the first and second positions a number of times per second, preferably up to 20 times per second. As a result of the switching valve switching back and forth between the first and second positions at a defined frequency, it is possible for the variable cooling flow and the lubricating flow to be divided between the first and second clutches in any desired way. The interaction of the switching valve, which can switch quickly, and the control valve for the cooling flow allows the volumetric flows for the two clutches to be varied within wide limits. If, for example, the switching valve switches back and forth between the first and second positions and the switching time for which the switching valve dwells in the first position corresponds to the switching time for which the switching valve dwells in the second position, identical volumetric flows result for the first and second clutches. If the ratio of the switching times is set differently, it is possible to control and vary the ratio of the first and second volumetric flows accordingly. If, for example during the switching back and forth, the switching time in the first position is double the switching time in the second position, the first clutch is fed a volumetric flow which is composed of two parts lubricating flow and one part cooling flow.

In a preferred exemplary embodiment, the switching valve can be actuated by a signal from at least one signaling element which is used to select a shifting actuator, to select a group of shifting actuators from a plurality of shifting actuators in the dual clutch transmission or to select a chamber of a shifting actuator. By way of example, a signaling element which, when it generates a signal, selects the shifting actuators for engaging/releasing the gears of a first partial transmission, can be used to switch the switching valve. The corresponding signal also actuates the switching valve and switches it into the second position, so that the first clutch, which is assigned to the first partial transmission, is supplied with the variable cooling flow. To ensure that it is easy to engage the gears in the first partial transmission, the cooling flow is set to zero, so that in the first clutch the drag torque caused by the oil which is present in the first clutch is reduced or set to zero. Consequently, there is no need for a separate signaling element for the switching valve, making use of the special relationships in the switching logic of the hydraulic system in the dual clutch transmission.

In principle, any desired signaling element which already has a further use in the hydraulic system could also be used to switch the switching valve. In this case, it merely needs to be ensured that this corresponding signaling element is used to switch the switching valve only at times when it is not needed for the other use.

It is also possible that the switching valve can be actuated by a signal from at least one signaling element, by means of which the first or second clutch can be switched to an unpressurized state. For example, if the signal from a signaling element leads to the first clutch being switched to an unpressurized state, this signal can be used to switch the switching valve into its second position. This leads to the clutch which has been switched to the unpressurized state being supplied with the variable cooling flow, which can be set to a value of zero. As has already been described above, it would then be easy to engage the gears of the first partial transmission, since the drag torque in the first clutch is reduced.

In a preferred exemplary embodiment, the switching valve can be actuated by signals from at least one signaling element for shifting actuator selection and from at least one signaling element for switching one of the shifting clutches to an unpressurized state, the signal from the signaling element for switching the clutch to an unpressurized state being stronger than the signal from the signaling element for shifting actuator selection. If, for example, neither clutch is switched to an unpressurized state, there is no signal for switching the clutch (es) to an unpressurized state applied to the switching valve. In this case, the signaling element for shifting actuator selection can be used to switch the switching valve back and forth as desired, provided that shifting actuator selection is not intended in this switching state of the two clutches. In this context, the term "shifting actuator selection" is also intended to encompass the selection of a chamber of a shifting actuator. The latter may then be designed as a double-acting shifting cylinder with two chambers.

However, if a signal from a signaling element for switching a clutch to an unpressurized state is present, the signal from the signaling element for shifting actuator selection has no influence on the position of the switching valve.

The switching valve can preferably be actuated by at least one hydraulic element which can be used to carry out the force control for the shifting actuators. As a result, there is no need for a separate component for generating a signal for actuating the switching valve.

BRIEF DESCRIPTION OF THE DRAWINGS

The invention is explained in more detail on the basis of the exemplary embodiments illustrated in the figures, in which.

DETAILED DESCRIPTION OF THE DRAWINGS

Figure 1:
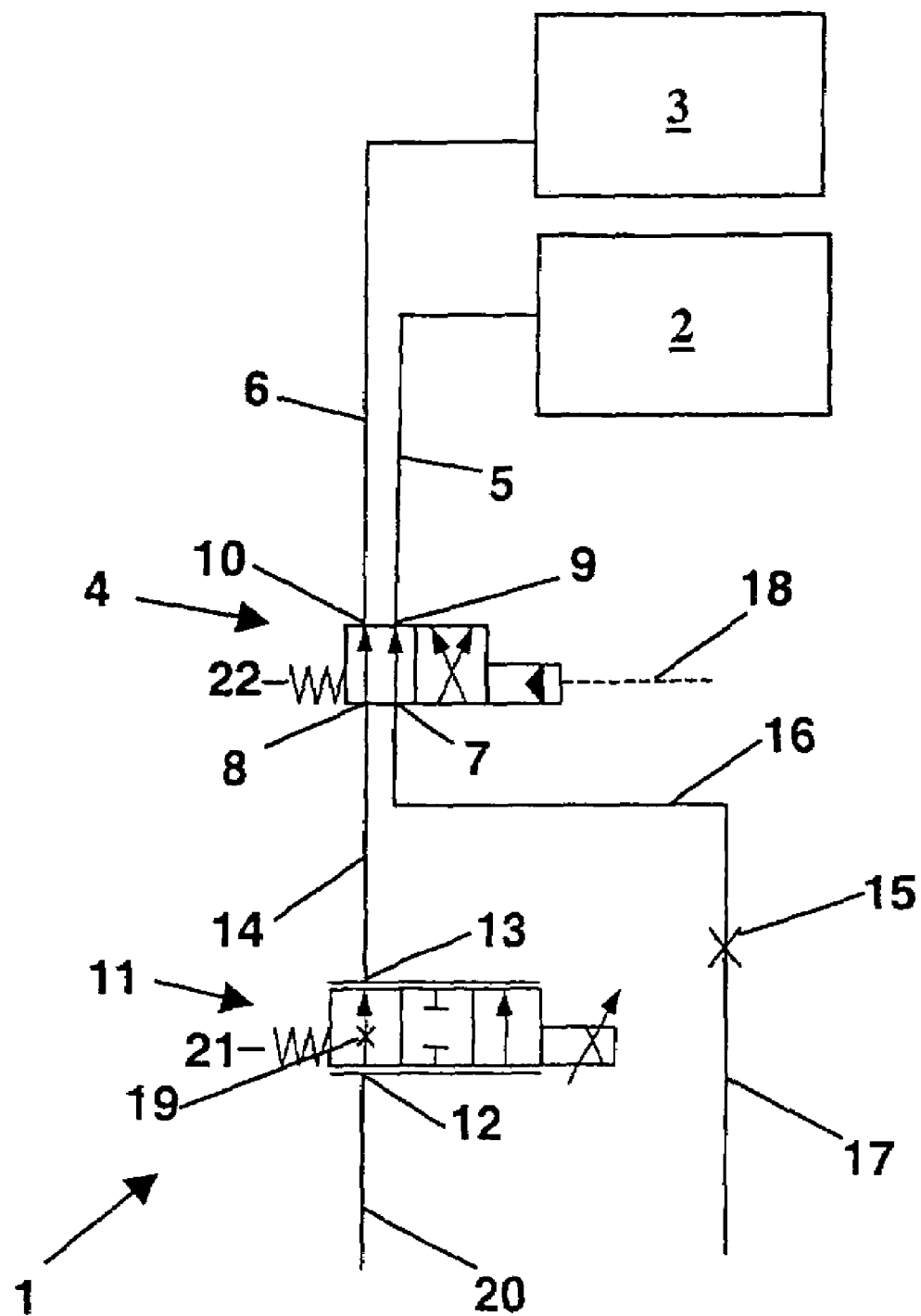
FIG. 1 shows an excerpt from a block diagram of a first exemplary embodiment of the invention.

FIG. 1 shows an excerpt from a block diagram of a hydraulic system according to the invention, which is denoted overall by 1. The hydraulic system 1 is used, inter alia, to cool and lubricate a first clutch 2 and a second clutch 3 of a dual clutch transmission (not shown in more detail).

A switching valve 4 is connected upstream of the first clutch 2 and the second clutch 3. The switching valve 4 is connected to the first clutch 2 via a line 5 and to the second clutch 3 via a line 6. The switching valve 4 is designed as a 4/2-way valve having a first and second inlet 7, 8 and having a first and second outlet 9, 10. The line 5 connects the first outlet 9 of the switching valve 4 to the first clutch 2, while the line 6 connects the second outlet 10 to the second clutch 3.

A control valve 11, which is designed as a 2/3-way valve having an inlet 12 and an outlet 13, is connected upstream of the second inlet 8 of the switching valve 4. A line 14 connects the outlet 13 of the control valve 11 to the second inlet 8 of the switching valve 4. A diaphragm 15, which is connected upstream of the first inlet 7 of the switching valve 4, provides a constant volumetric flow in a line 16, provided that the pressure upstream of the diaphragm 15 in the feed line 17 is constant. The line 16 connects the diaphragm 15 to the first inlet 7 of the switching valve 4. The volumetric flow in the line 16 is referred to below as the lubricating flow.

FIG. 1 shows the switching valve 4 in a spring-loaded at-rest position, which is intended to correspond to a first position of the switching valve 4. As can be seen from the illustration, in the first position the switching valve 4 connects the outlet 13 of the control valve 11 to the second clutch 3 and the feed line 17, i.e. the line 16, to the first clutch 2.

By applying a signal via a signal line 18, the switching valve can be switched into a second position, in which the control valve 11 is connected to the first clutch 2 and the line 16 is connected to the second clutch 3.

The control valve 11 can adopt three positions: in a first position (illustrated in FIG. 1), a diaphragm 19, which provides a defined volumetric flow in the line 14 if a constant pressure is present in a feed line 20 upstream of the control valve 11, is connected between inlet 12 and outlet 13. In a second position, inlet 12 and outlet 13 are disconnected from one another, with the result that no coolant or lubricant, which is preferably in the form of an oil, is flowing in line 14. In the third position of the control valve 11, inlet 12 and outlet 13 are connected without a diaphragm or the like, which at a given pressure in the feed line 20 leads to a maximum volumetric flow in the line 14.

A different volumetric flow, to be referred to here as the cooling flow, is established in the line 14 depending on the position of the control valve 11. By switching back and forth between, for example, the second and third positions of the control valve 11, it is possible to set a time-average cooling flow which is between 0 l/min and the abovementioned maximum volumetric flow in the line 14. If the control valve is actuated with a sufficiently high frequency, therefore, a uniform cooling flow which is between zero and a maximum value is established in the line 14.

The control valve 11 is switched by the application of a current I. At a current I equal to zero, a spring 21 presses the control valve 11 into the first position. This means that if there is a fault in the actuation of the control valve 11 which leads to a failure of the current I, a defined volumetric flow or cooling flow which is dependent on the diaphragm 19 is ensured. At a maximum current $I_{Max}$, as could be present in the event of a short circuit, the control valve 11 is switched into the third position, in which a maximum cooling flow is set.

Depending on the position of the switching valve 4, the variable cooling flow can be passed to the first clutch 2 or the second clutch 3, while the constant lubricating flow in the line 16 is correspondingly passed to the respective other clutch. Since the two clutches 2, 3 are cooled and lubricated exclusively by means of the flows passing through the line 14 (cooling flow) and through the line 16 (lubricating flow), for example in the first position of the switching valve 4 the lubricating flow corresponds to a first volumetric flow in the line 5 which cools and lubricates the first clutch 3. Accordingly, the cooling flow in the line 14 represents a second volumetric flow in the line 6 which cools and lubricates the second clutch 3.

The provision of volumetric flows for cooling and lubricating the clutches 2 and 3 which is illustrated in FIG. 1 can continue to function (to a limited extent) even in the event of individual components or signals failing. If the signal supplied by the signal line 18 fails, the switching valve 4 can no longer be switched. A spring 22 ensures that in this case the first position illustrated in FIG. 1 is adopted. If the cooling flow passing through the line 14 and the lubricating flow passing through the line 16 are sufficiently high, both clutches 2, 3 continue to be cooled and lubricated, which means that at least emergency operation continues to be possible. If the current I for the control valve 11 fails, the spring 21 switches the control valve 11 into its first position, with the result that a defined cooling flow passes to the switching valve 4 through the diaphragm 19.

By rapidly switching the switching valve 4 back and forth, it is possible to equally divide the variable cooling flow from the control valve 11 and the lubricating flow predetermined by the diaphragm 15 between the two clutches 2, 3. It is also possible to implement an appropriate weighting by means of different switching times. By way of example, during switching back and forth, the switching valve could remain in the first position for two time units and in the second position for one time unit. The first volumetric flow for cooling and lubricating the first clutch 2 would then on average be composed of two parts lubricating flow and one part cooling flow.

Figure 2:
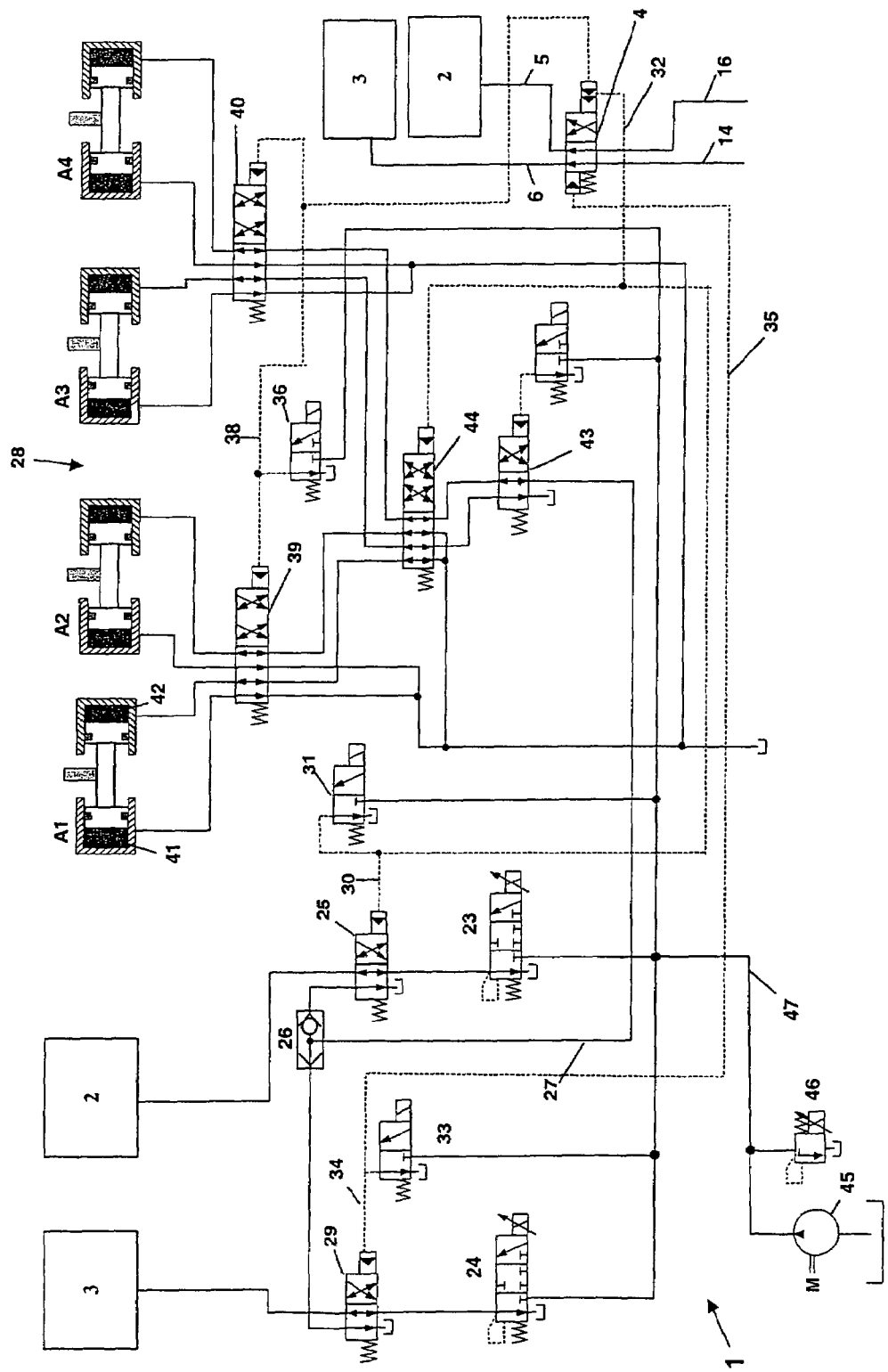
FIG. 2 shows a block diagram of another exemplary embodiment of the invention.

FIG. 2 shows the excerpt illustrated in FIG. 1 in modified form together with further parts of the hydraulic system 1. The excerpt illustrated in FIG. 1 is arranged on the right-hand side of FIG. 2, although the control valve 11, the diaphragm 15 and the associated feed lines 17, 20 are not illustrated.

In addition to the subsystem for cooling and lubricating the first and second clutches 2, 3 shown in FIG. 1, the hydraulic system 1 also comprises a first pressure regulator 23 and a second pressure regulator 24. The pressure regulators 23, 24 provide modeled pressures, by which either the first and second clutch 2, 3 or one of the four shifting actuators A1 to A4 can be actuated. A switching valve 25 is arranged between the first pressure regulator 23 and the first clutch 2. This switching valve 25 allows the modeled pressure of the pressure regulator 23 to be applied either to the first clutch 2 or to a switching means 26 which is connected via a line 27 to a shifting system 28, which includes the abovementioned shifting actuators A1 to A4.

Similarly, a switching valve 29, which applies the pressure regulated by the pressure regulator 24 either to the second clutch 3 or to the switching means 26, is connected between the second clutch 3 and the second pressure regulator 24. Depending on the pressures present on the inlet side, the switching means 26 produces either a connection between the switching valve 25 and the shifting system 28 or a connection between the switching valve 29 and the shifting system 28.

The switching valve 25 is switched by a control pressure which is supplied by a control line 30. The control line 30 connects the switching valve 25 to a signaling element 31 which is electromagnetically actuated. It can be seen that the control pressure from the signaling element 31 is also switched onto the switching valve 4 via a line 32.

The switching valve 29 is likewise assigned a signaling element 33 which generates a control pressure, and this signaling element is connected to the switching valve 29 via a signal line 34. The control pressure from the signaling element 33 is passed to the switching valve 4 via a signal line 35. As can be seen from FIG. 2, the control pressure from the signaling element 33 ensures that the switching valve 4 is pressed into its first position, whereas the control pressure from the signaling element 31 presses the switching valve 4 into its second position, counter to the force of the spring 22.

Furthermore, the switching valve 4 is actuated by a control pressure which is generated by a further signaling element, namely a signaling element 36. The signaling element 36 is connected to the switching valve 4 via a line 37. The signaling element 35, via a line 38, switches two chamber selection valves 39, 40 which are arranged between the shifting actuators A1 to A4 and the line 27. Moreover, an actuator selection valve 43 and a group selection valve 44 are provided to enable the pressure prevailing in the line 27 to be deliberately applied to one of the two chambers 41, 42 of a defined shifting actuator A1 to A4 while at the same time all the other chambers are switched to an unpressurized state. In this case, the group selection valve 44 routes the pressure in the line 27 either to the actuators A1 and A2 or to the actuators A3 and A4. Either shifting actuator A1 or A2 (or alternatively A3 or A4) is selected by the actuator selection valve, depending on the position of the group selection valve 44. The group selection valve 44 is actuated by the same control signal, namely by the control pressure from the signaling element 31, which makes it possible to eliminate one signaling element.

A motor-driven pump 45 with a main pressure regulator 46 provides an operating pressure which is applied, for example, to the inlet side of the pressure regulators 23, 24 or to the inlet 12 of the control valve 11 (cf. FIG. 1) via a distribution system 47.

If both switching valve 25 and switching valve 29 are in the positions illustrated in FIG. 2, the pressures of the pressure regulators 23, 24 are passed to the clutches 2, 3. Depending on the modeled pressures, the clutches 2, 3 can each transmit a torque, with the result that a certain torque overlap is possible, which is required in order to merge the torque from one partial transmission of the dual clutch transmission to the other. In this phase, the line 27 is switched to an unpressurized state by means of the switching valves 25, 29. In this phase there are also no control pressures from the signaling elements 31, 33 applied, so that the switching valve 4 can be actuated by the signaling element 36 alone. The signaling element 36 allows the variable cooling flow in the line 14 or the constant lubricating flow in the line 16 to be divided between the clutches 2, 3 in any desired and required way, for example by rapid switching back and forth as described above.

When a gear is to be engaged, for example a gear which can be engaged by one of the shifting actuators A1, A2 which belong to a first partial transmission assigned to the first clutch, a control pressure from the signaling element 31 moves the switching valve 25 into its second position. As a result, the first clutch 2 is switched to an unpressurized state and opens. The control pressure from the signaling element 31, on account of the connection via the line 32, is also applied to the switching valve 4 and presses the latter into its second position. As a result, the cooling flow in the line 14 is passed to the first clutch 2. The cooling flow can now be lowered to 0 l/min, so that a drag torque in the first clutch 2, caused by the coolant, is significantly reduced. This simplifies engaging of a gear.

In a similar way, the system 1 according to the invention simplifies the shifting of a gear by the shifting actuators A3 and A4 which belong to a second partial transmission of the dual clutch transmission. For this purpose, the second clutch 3 is switched to an unpressurized state, with the control pressure from the signaling element 33 applied to the switching valve 29 and to the switching valve 4. The control pressure presses the switching valve 4 into its first position, irrespective of the signaling element 36, since the control pressure from the signaling element 33 is greater than the control pressure from the signaling element 36. The variable cooling flow, which can be reduced to zero, is then passed to the second clutch 3, with the result that a shifting actuator A3, A4 can engage a gear without a drag torque in the second clutch 3.

Figure 3:
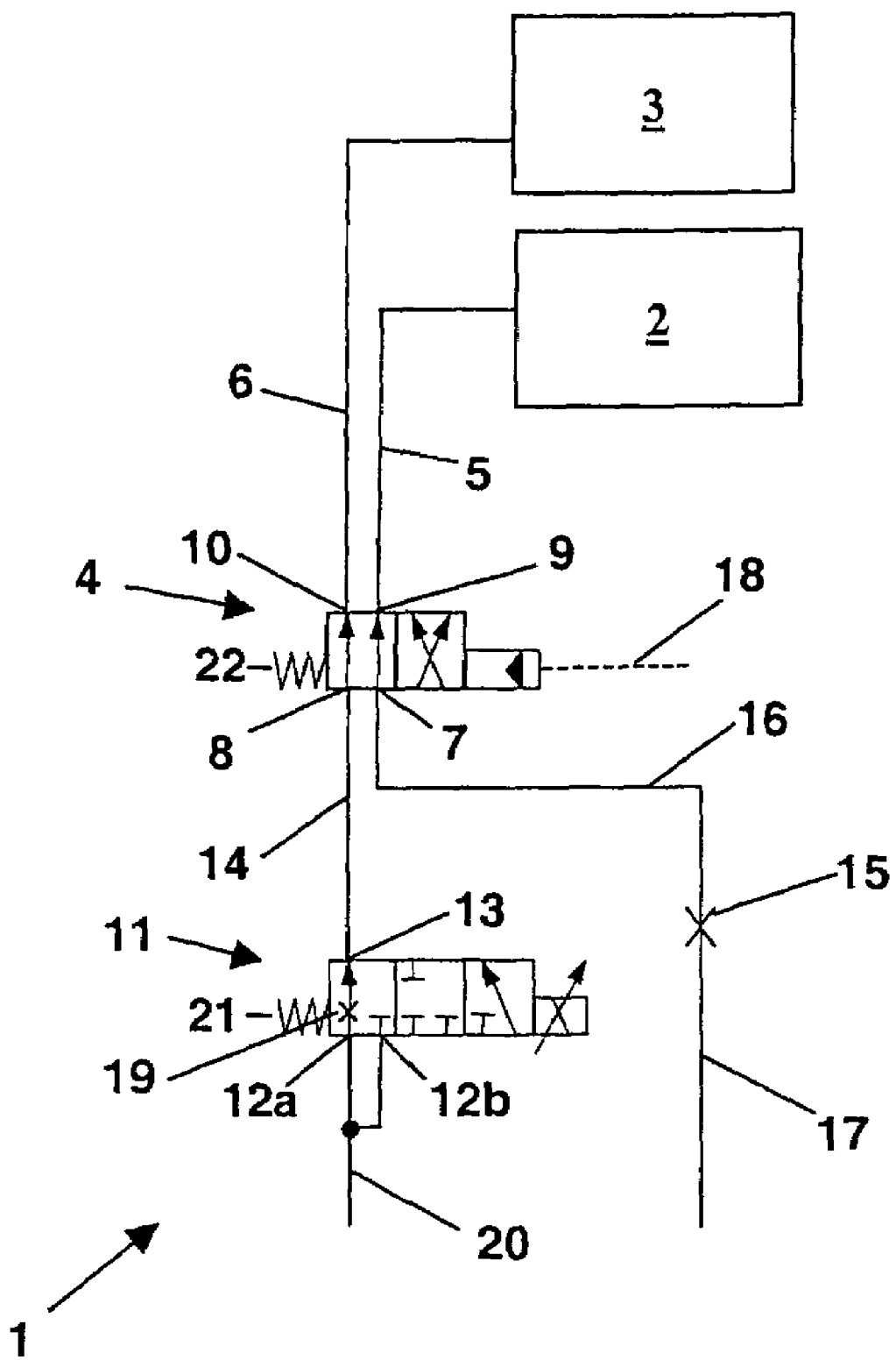
FIG. 3 shows a modified exemplary embodiment.

FIG. 3 shows a modified exemplary embodiment of the invention, which differs from the exemplary embodiment shown in FIG. 1 by virtue of the fact that the control valve 11 is designed as a 3/3-way valve. The 3/3-way valve 11 in this case has two inlets, namely a first inlet 12a and a second inlet 12b. In the first position (illustrated in FIG. 3) of the 3/3-way valve, a diaphragm is shifted between the first inlet 12a and the outlet 13, while second inlet 12b is disconnected from the outlet 13. In the second position, both inlets 12a, 12b are disconnected from the outlet 13. In the third position, the 3/3-way valve allows an unimpeded flow between the second inlet 12b and the outlet 13, whereas first inlet 12a is disconnected from the outlet 13.

LIST OF DESIGNATIONS

1 Hydraulic system
2 First clutch
3 Second clutch
4 Switching valve
5 Line
6 Line
7 First inlet
8 Second inlet
9 First outlet
10 Second outlet
11 Control valve
12 Inlet
13 Outlet
14 Line
15 Diaphragm
16 Line
17 Feed line
18 Signal line
19 Diaphragm
20 Feed line
21 Spring
22 Spring
23 First pressure regulator
24 Second pressure regulator
25 Switching valve
26 Switching means
27 Line
28 Shifting system
29 Switching valve
30 Control line
31 Signaling element
32 Line
33 Signaling element
34 Signal line
35 Signal line
36 Signaling element
37 Signal line
38 Signal line
39 Chamber selection valve
40 Chamber selection valve 41 Chamber
42 Chamber
43 Actuator selection valve
44 Group selection valve
45 Pump
46 Main pressure regulator
47 Distribution system
12a Inlet
12b Inlet
A1 to A4 Shifting actuators

The invention claimed is:

1. A hydraulic system for providing pressures and volumetric flows in a dual clutch transmission, comprising:
    a first clutch
    a second clutch
    a first feed line providing a volumetric cooling flow for said first and second clutches;
    a second feed line providing a volumetric lubricating flow for said first and second clutches;
    at least one switching valve upstream of said first and second clutches, the switching valve having:
        a first inlet port connected to the first feed line,
        a second inlet port connected to the second feed line,
        a first outlet port connected to the first clutch, and
        a second outlet port connected to the second clutch;
    wherein
    said first and second feed lines are separated from each other;
    said switching valve is controlled for guiding in a controlled manner in a first position the lubricating flow onto the first clutch and the cooling flow onto the second clutch and in a second position the lubricating flow onto the second clutch and the cooling flow onto the first clutch.

2. The system as claimed in claim 1, wherein the sum of the first and second volumetric flows for cooling and lubricating the first and second clutches corresponds to the sum of the lubricating flow and the cooling flow.

3. The system as claimed in claim 1, wherein a control valve that controls the cooling flow is connected upstream of the switching valve.

4. The system as claimed in claim 3, wherein the cooling flow is not zero in the absence of a signal which actuates the control valve.

5. The system as claimed in claim 4, wherein the control valve is designed as a 2/3-way valve having an inlet and an outlet which in a first position shifts a diaphragm between the inlet and the outlet, in a second position disconnects the inlet from the outlet, and in a third position connects the inlet with the outlet, the control valve adopting the first position when the value of the signal is equal to zero.

6. The system as claimed in claim 4, wherein the control valve is designed as a 3/3-way valve having a first inlet, a second inlet and an outlet, which in a first position shifts a diaphragm between the first inlet and the outlet, in a second position disconnects the first and second inlet from the outlet, and in a third position connects the second inlet with the outlet, the control valve adopting the first position when the value of the signal is equal to zero.

7. The system as claimed in claim 3, wherein the control valve can be switched between the various positions a number of times per second.

8. The system as claimed in claim 7, wherein the control valve can be switched between the various positions up to 20 times per second.

9. The system as claimed in claim 1, wherein the cooling flow can be varied in a range from 0 liter/min up to a maximum value.

10. The system as claimed in claim 1, wherein a diaphragm, which can be used to set the lubricating flow to a constant value, is connected upstream of the switching valve.

11. The system as claimed in claim 1, wherein the switching valve can be switched between the first and second positions a number of times per second.

12. The system as claimed in claim 11, wherein the control valve can be switched between the various positions up to 20 times per second.

13. The system as claimed in claim 1, wherein the switching valve can be actuated by a signal from at least one signaling element which is used to select a shifting actuator, to select a group of shifting actuators from a plurality of shifting actuators in the dual clutch transmission or to select a chamber of a shifting actuator.

14. The system as claimed in claim 13, wherein the switching valve can be actuated by signals from the signaling element for shifting actuator selection and from the signaling element for switching the clutches to an unpressurized state, the signal to switch the clutches to an unpressurized state being stronger than the signal from the signaling element for shifting actuator selection.

15. The system as claimed in claim 1, wherein the switching valve can be actuated by a signal from at least one signaling element, by means of which the first or second clutch can be switched to an unpressurized state.

16. The system as claimed in claim 1, wherein the switching valve can be actuated by at least one hydraulic element which can be used to carry out the force control for the shifting actuators.

* * * * *